United States Patent
King

(10) Patent No.: US 7,109,695 B2
(45) Date of Patent: *Sep. 19, 2006

(54) ADAPTIVE DIGITAL VOLTAGE REGULATOR WITH SAME-CYCLE FEEDBACK

(75) Inventor: Paul Frederic King, Redwood City, CA (US)

(73) Assignee: Kiawe Forest LLC., Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/280,676

(22) Filed: Nov. 17, 2005

(65) Prior Publication Data

US 2006/0119339 A1    Jun. 8, 2006

Related U.S. Application Data

(63) Continuation-in-part of application No. 11/008,481, filed on Dec. 8, 2004, now Pat. No. 6,992,469.

(51) Int. Cl.
*G05F 1/46* (2006.01)

(52) U.S. Cl. ...................... 323/283; 323/285

(58) Field of Classification Search ............. 323/282, 323/283, 285, 351
See application file for complete search history.

(56) References Cited

U.S. PATENT DOCUMENTS

| 5,594,324 A  * | 1/1997 | Canter et al. ............... 323/282 |
| 6,841,979 B1 * | 1/2005 | Berson et al. .............. 323/282 |
| RE38,780 E   * | 8/2005 | Hawkes et al. ............. 323/282 |
| 6,992,469 B1 * | 1/2006 | King ............................ 323/283 |

* cited by examiner

*Primary Examiner*—Adolf Berhane

(57) ABSTRACT

A digitally-controlled, DC/DC converter includes a switched-mode power stage for the purpose of converting an input voltage (Vin) into an output voltage (Vout); the power stage including a controllable switching device, which is turned ON and OFF by a control device with temporal resolution $\Delta t$. The converter further includes a duty cycle control mechanism for controlling the duty cycle of the controllable switching device; the duty cycle control mechanism including a mechanism for estimating the output voltage error, and a selector mechanism for determining the turn OFF and turn ON times of the controllable switching device by choosing, cycle by cycle, an ON time/OFF time pair from a set of quantized ON time/OFF time pairs, choosing in such a manner that the amplitude of the output voltage error is continually minimized. At each switching cycle, the current output voltage error estimate is generated, and the ON time/OFF time pair chosen, after the switch has turned ON, but before the turn OFF time implicit in the chosen pair.

22 Claims, 10 Drawing Sheets

FIG 6

| DT | DQmin | | DQmax | |
|---|---|---|---|---|
| | ON | OFF | ON | OFF |
| 1 | 0 | 16 | 1 | 16 |
| 2 | 0 | 16 | 1 | 16 |
| 3 | 0 | 16 | 1 | 16 |
| ••• | ••• | ••• | ••• | ••• |
| 55 | 6 | 9 | 7 | 8 |
| 56 | 6 | 9 | 7 | 8 |
| 57 | 7 | 10 | 8 | 9 |
| 58 | 7 | 9 | 8 | 8 |
| 59 | 7 | 10 | 8 | 8 |
| 60 | 7 | 9 | 8 | 8 |
| 61 | 7 | 9 | 8 | 7 |
| 62 | 7 | 9 | 9 | 7 |
| 63 | 7 | 9 | 9 | 7 |
| 64 | 8 | 8 | 9 | 7 |
| 65 | 8 | 9 | 9 | 7 |
| 66 | 8 | 9 | 9 | 7 |
| 67 | 8 | 9 | 9 | 6 |
| 68 | 8 | 9 | 9 | 7 |
| 69 | 8 | 8 | 9 | 6 |
| 70 | 8 | 8 | 9 | 6 |
| 71 | 8 | 7 | 10 | 6 |
| 72 | 9 | 7 | 10 | 6 |
| 73 | 9 | 8 | 10 | 6 |
| 74 | 9 | 7 | 10 | 6 |
| 75 | 9 | 8 | 10 | 6 |
| 76 | 9 | 7 | 10 | 6 |
| ••• | ••• | ••• | ••• | ••• |
| 125 | 16 | 1 | 16 | 0 |
| 126 | 16 | 1 | 16 | 0 |
| 127 | 16 | 1 | 16 | 0 |

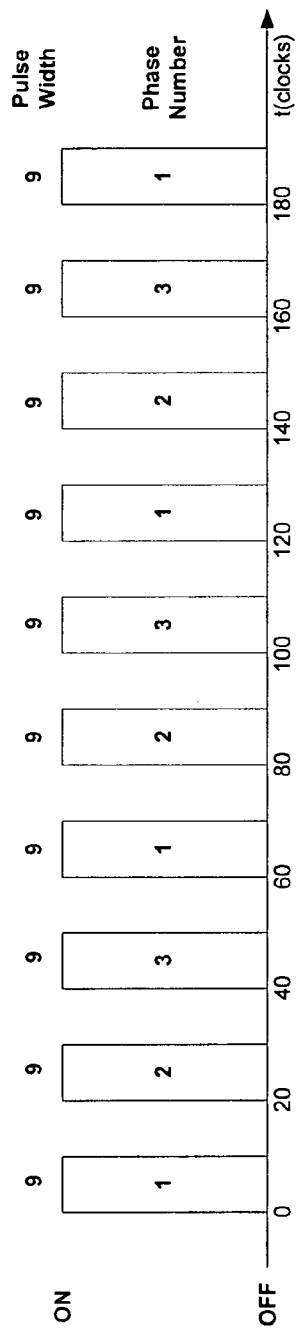
Figure 7a. Three Phase Buck Converter   $V_{IN}$ =12VDC   $V_{OUT}$ = 1.8VDC
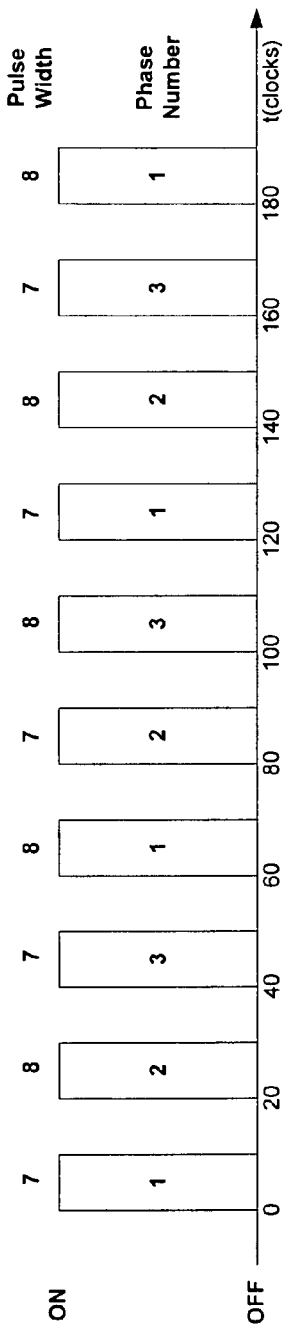
Figure 7b. Three Phase Buck Converter   $V_{IN}$ =12VDC   $V_{OUT}$ = 1.5VDC

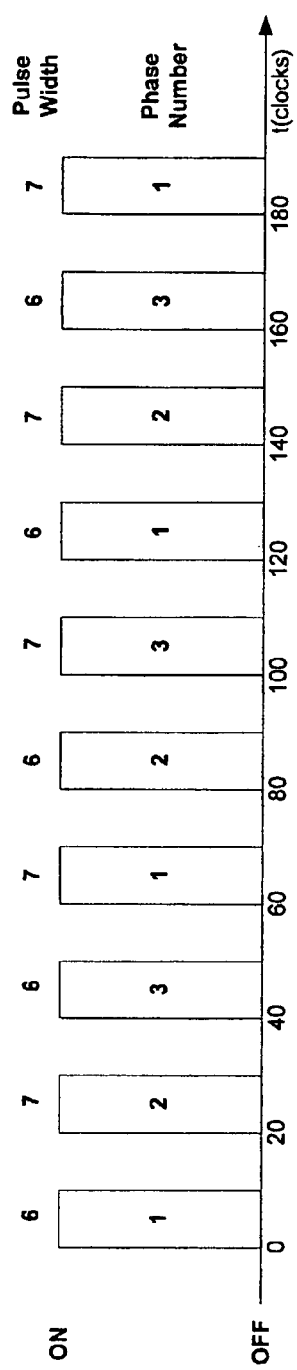
Figure 8a. Three Phase Buck Converter  $V_{IN}$ =12VDC  $V_{OUT}$ = 1.3VDC
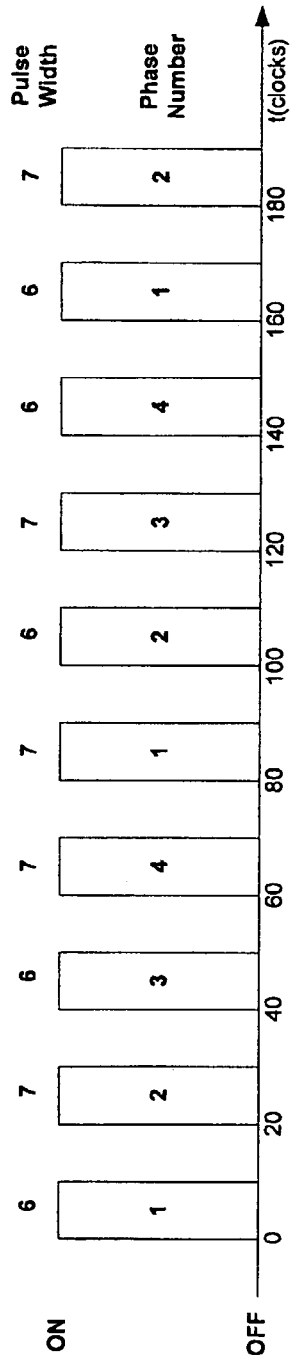
Figure 8b. Four Phase Buck Converter  $V_{IN}$ =12VDC  $V_{OUT}$ = 1.3VDC

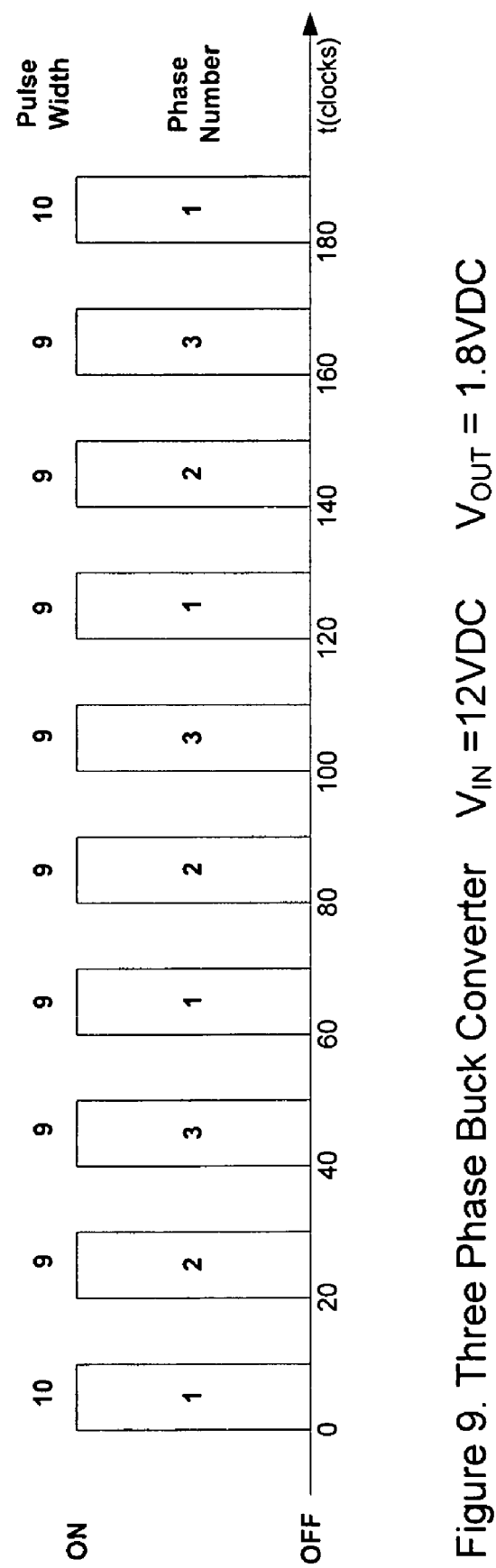
Figure 9. Three Phase Buck Converter   $V_{IN} = 12VDC$   $V_{OUT} = 1.8VDC$

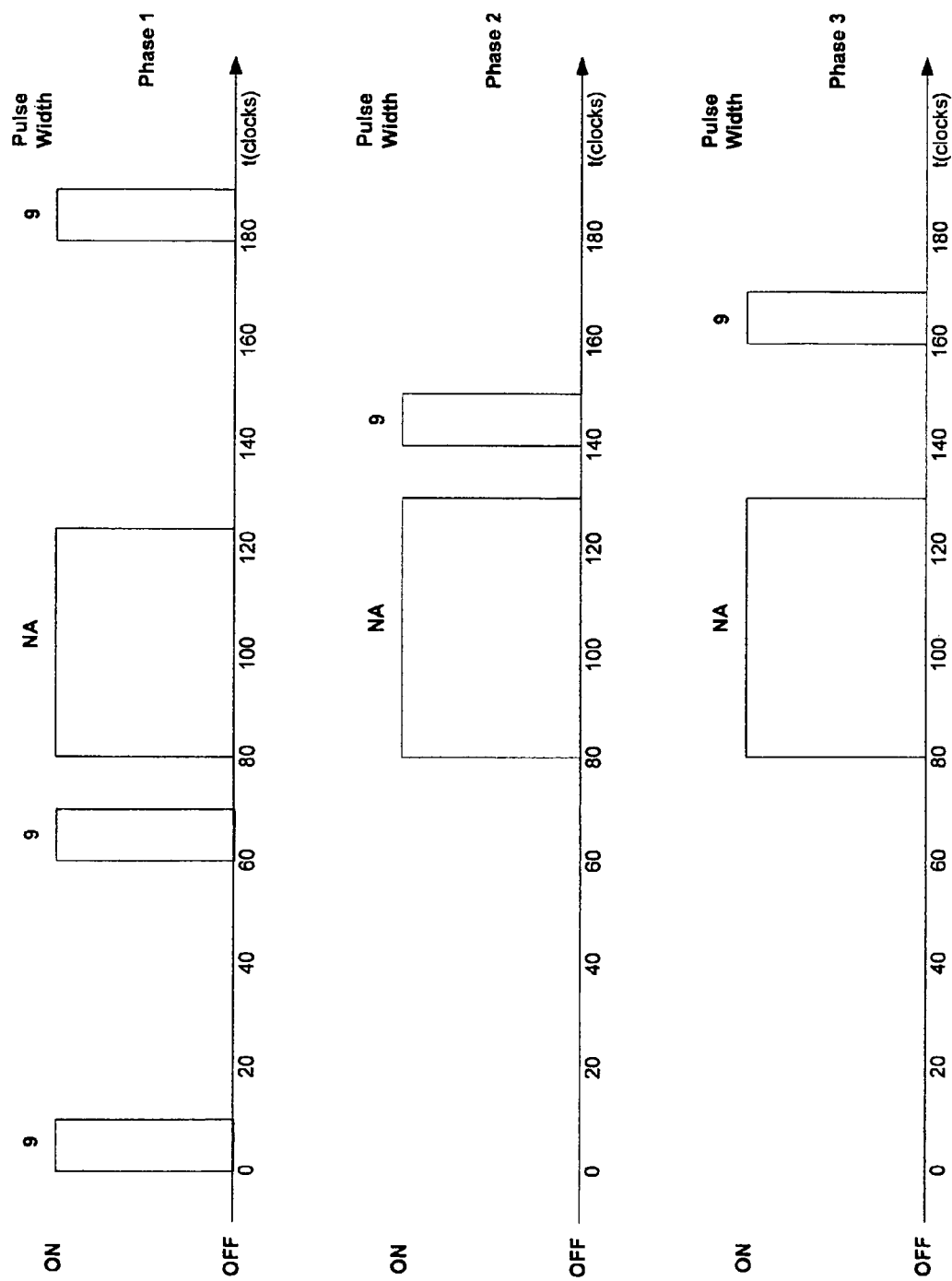
Figure 10. Three Phase Buck Converter  $V_{IN} = 12VDC$   $V_{OUT} = 1.8VDC$

ADAPTIVE DIGITAL VOLTAGE REGULATOR WITH SAME-CYCLE FEEDBACK

CROSS-REFERENCE TO RELATED APPLICATIONS

This application is a continuation-in-part application of, and claims priority under 35 U.S.C. § 120 from, U.S. patent application Ser. No. 11/008,481, entitled "Digital Voltage Regulator for DC/DC Converters," filed on Dec. 8, 2004 now U.S. Pat. No. 6,992,469, the subject matter of which is incorporated by reference herein in its entirety.

STATEMENT REGARDING FEDERALLY SPONSORED RESEARCH OR DEVELOPMENT

Not Applicable

BACKGROUND OF THE INVENTION

The invention pertains generally to the field of power conversion, and more particularly to digitally-controlled switched-mode DC/DC converters.

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the load on the power converter varies dynamically, or there is a requirement to track changes in load with minimal output voltage error, regulation of these converters is accomplished by continually estimating the output voltage error (the output voltage error being the difference between the uncorrupted output voltage and the desired output voltage) and continually adjusting the duty cycle of the switching device to compensate for changes in load conditions manifest in output voltage error estimates. In this case, the act of regulation consists of controlling, cycle by cycle, the duty cycle of the switching device in accordance with output voltage error estimates, so that the amplitude of the output voltage error is continually minimized.

Regulation mechanisms for this purpose, known as pulse width modulation (PWM) regulators, generally incorporate a pulse width control mechanism and a duty cycle control mechanism, where the former generates the ON pulse appropriate to the realization of the duty cycle generated by the latter. Duty cycle control mechanisms thus incorporate a mechanism for estimating the target duty cycle (the target duty cycle being the duty cycle essential to achieve the desired output voltage). A target duty cycle estimation mechanism is commonly a feedback mechanism, driven by the output voltage error, but it could as well be a feedforward mechanism, driven by the input voltage, or some combination of the two.

The most commonly used pulse width control mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital PWM regulation mechanisms, replacing analog PWM regulators, have been developed and are being commercialized. It is the nature of such mechanisms that the generated pulse widths are quantized—a consequence of the temporal resolution of the digital regulation mechanism. If the temporal resolution of the regulation mechanism is $\Delta t$, then the pulse widths are constrained to be integral multiples of $\Delta t$. Furthermore, switching cycles, spanning consecutive ON and OFF pulses, are likewise constrained to be integral multiples of $\Delta t$.

One challenge to those who would apply digital PWM regulation mechanisms to power converters, especially DC/DC converters employed in battery-powered mobile applications, is the challenge of achieving acceptable application performance with digital regulation mechanisms. Quantization of pulse widths translates into quantized duty cycles, which constrain the ability of any duty cycle control mechanism to limit output voltage ripple to an arbitrary application-dictated level.

To understand the nature of this challenge, consider a DC/DC converter in a battery powered mobile application. The switching frequency is typically set in the neighborhood of 1 MHz, to minimize the size and cost of discrete components and maximize the operating efficiency of the converter. A digital PWM regulation mechanism operating at 16 MHz would thus be able to generate pulses widths of 0, $\frac{1}{16}$ usec, $\frac{2}{16}$ usec, $\frac{3}{16}$ usec . . . $\frac{16}{16}$ usec. Assuming a fixed switching frequency, 17 instantaneous duty cycles (including 0 and 1) could be applied. One method for regulating the output voltage would be to alternate between two quantized duty cycles, one smaller than the target duty cycle, and the other larger. In one embodiment of this concept (cf. U.S. Pat. No. 6,677,733), the duty cycle control mechanism examines the current output voltage error estimate, and if it is positive, selects the smaller duty cycle for the next cycle of the switching device. Similarly, if the current output voltage error estimate is negative, it selects the larger duty cycle for the next cycle of the switching device. At its best, however, this duty cycle control mechanism may not be able to limit output voltage ripple to an acceptable level . . . in which case the only obvious recourse for manufacturers of regulators is to improve the temporal resolution of the regulation mechanism . . . i.e., boost the clock frequency.

Even if the ripple is tolerable under static line and load conditions, it may present a challenge to tight regulation under dynamic load conditions, owing to the difficulty in providing accurate output voltage feedback in the presence of increased (though tolerable) ripple. In this case the only obvious recourse to manufacturers of regulators to minimize ripple without penalizing dynamic performance is to boost the clock frequency. But boosting the clock frequency to mitigate the effects of quantization on output voltage error (static and dynamic) may compromise cost and efficiency metrics. For example, the complexity and, consequently, the cost of the digital regulation mechanism are likely to increase as well as the power dissipation. Moreover, the increased cost and power dissipation will be further multiplied, if the requirement to boost the clock frequency should prevent the integration (at a substrate level) of the digital regulation mechanism with other electronic componentry.

Clearly there is a need for digital control methods that mitigate the requirement for higher clock frequencies solely for the purpose of achieving acceptable output voltage error (static and dynamic) in a broad class of DC/DC converters.

BRIEF SUMMARY OF THE INVENTION

The primary objective of this invention is to provide digital control methods that mitigate the requirement for higher clock frequencies solely for the purpose of achieving acceptable output voltage error (static and dynamic) in a broad class of DC/DC converters.

To this end, a digital duty cycle control mechanism, including a mechanism for estimating the output voltage error; a mechanism for estimating the target duty cycle, a novel duty cycle quantization mechanism for determining a first set of one or more quantized ON time/OFF time pairs for regulating the output voltage, and a novel output-voltage-error-driven selector mechanism for determining the turn ON and turn OFF times of the switching device by choosing, cycle by cycle, from a second set of two or more quantized ON time/OFF time pairs, derived from the first set, is disclosed.

The novelty of the duty cycle quantization mechanism follows from the insight that the output voltage ripple resulting from a sequence of quantized switching cycles (a cycle being the sum of consecutive ON and OFF times) decreases as the number of quantized switching cycles available to generate the sequence increases; and that the number available can be expanded by relaxing the (prior art) premise that all switching cycles be fixed in length, cycle by cycle, under nominal load conditions. If, for example, the switching cycle were allowed to shrink/stretch by the temporal resolution of the digital regulation mechanism, the number of available switching cycles increases three-fold, with the potential for comparable reductions in output voltage ripple.

The novelty of the selector mechanism follows from the insight that in a temporally quantized switching environment, the feedback mechanism controlling the switch is fundamentally limited in the amount of useful information it can provide at each cycling of the switch. For example, a digital regulation mechanism practicing conventional fixed-frequency pulse width modulation may provide as little as four bits, cycle by cycle. Under these circumstances, when it is impossible, even in the steady state, to form a pulse of the width required to drive the output voltage error precisely to zero, it is critical to be able to choose a quantized pulse appropriate to driving the error back toward zero when the error changes sign, as taught in the previously cited prior art. In other words, instantaneous output voltage error feedback must be available, even if its reliability is limited to 1 bit, to operate effectively in a temporally quantized environment.

When these insights are combined in a duty cycle quantization mechanism for determining, from an estimated target duty cycle, a first set of one or more quantized ON time/OFF time pairs for regulating the output voltage, and in a novel output-voltage-error-driven selector mechanism for determining the turn ON and turn OFF times of the switching device by choosing, cycle by cycle, from a second set of two or more quantized ON time/OFF time pairs, derived from the first set, the ripple induced by quantization as well as the delay in the feedback path are reduced. To illustrate the latter point, the choosing of ON time/OFF time pairs, instead of ON times, means that the choice can be broken into two choices: ON time and OFF time; and that feedback measured during the ON time AND during the OFF time may be applied virtually instantaneously to regulate the output voltage.

In accordance with the present invention, a method is provided for converting an input voltage to an output voltage by means of a switched-mode DC/DC converter; the input voltage being converted into an output voltage with the aid of a power stage, including at least one controllable switch, which is turned ON and turned OFF by a control device characterized in that owing to the temporal resolution of the control device ($\Delta t$), both the turn ON and turn OFF times of the controllable switching device are constrained to be integral multiples of $\Delta t$.

Central to this method is a duty cycle control mechanism for controlling the duty cycle of the controllable switching device, the duty cycle control mechanism including a mechanism for estimating the output voltage error; a mechanism for estimating the target duty cycle; a duty cycle quantization mechanism for determining, for a target duty cycle estimate, a first set of quantized ON time/OFF time pairs suitable for controlling said controllable switching device, characterized in that the sum of the quantized ON time and OFF time of each pair (in said first set) is constrained to a set of discrete values $\{Tswi\}$ ($i=1, 2, \ldots I$) where I is a positive integer and Tswi is an integral multiple of $\Delta t$; and an output-voltage-error-driven selector mechanism for determining the turn ON and turn OFF times of said controllable switching device by choosing, cycle by cycle, an ON time/OFF time pair from a second set of quantized ON time/OFF time pairs, derived from said first set and similarly constrained, choosing in such a manner that the amplitude of the output voltage error is continually minimized.

In accordance with the present invention, a switched-mode DC/DC converter is provided, comprising;

a power stage for the purpose of converting an input voltage into at least one output voltage, the power stage including at least one controllable switching device; and a control device for the purpose of turning ON and turning OFF the controllable switching device, characterized in that owing to the temporal resolution of the control device ($\Delta t$), both the turn ON and turn OFF times of the controllable switching device are constrained to be integral multiples of $\Delta t$; and a duty cycle control mechanism for controlling the duty cycle of said controllable switching device, comprising:

a mechanism for estimating output voltage error; and a mechanism for estimating the target duty cycle; and a duty cycle quantization mechanism for determining, for a target duty cycle estimate, a first set of at least one quantized ON time/OFF time pair suitable for controlling said controllable switching device, characterized in that the sum of the quantized ON time and OFF time of each pair (in said first set) is constrained to a set of discrete values $\{Tswi\}$ ($i=1, 2, \ldots I$) where I is a positive integer and Tswi is an integral multiple of $\Delta t$; and an output-voltage-error-driven duty cycle selector mechanism for determining the turn ON and turn OFF times of said controllable switching device by choosing, cycle by cycle, an ON time/OFF time pair from a second set of at least two quantized ON time/OFF time pairs, derived from said first set and similarly constrained, choosing in such a manner that the amplitude of the output voltage error is continually minimized.

In a preferred embodiment, the duty cycle selector mechanism determines turn ON and turn OFF times by choosing, cycle by cycle, an ON time/OFF time pair from a set of two quantized ON time/OFF time pairs, extracted from a table (of sets) indexed by the estimated target duty cycle; choosing the ON time/OFF time pair with the lower implied duty cycle when the output voltage error estimate is positive (i.e., the output voltage is higher than the desired output voltage), and the pair with the higher implied duty cycle when the output voltage error estimate is negative.

In a second preferred embodiment, the duty cycle selector mechanism determines turn ON and turn OFF times by choosing, cycle by cycle, an ON time/OFF time pair from a set of three quantized ON time/OFF time pairs, generated by the selector mechanism from a quantized ON time/OFF time pair generated by the duty cycle quantization mechanism; choosing the ON time/OFF time pair with the lowest implied duty cycle when the output voltage error estimate is highest, and the pair with the highest implied duty cycle when the output voltage error estimate is lowest, and the remaining pair when the output voltage error is neither highest nor lowest.

In a third preferred embodiment, the duty cycle selector mechanism determines turn ON and turn OFF times by choosing, cycle by cycle, an ON time/OFF time pair from a set of six quantized ON time/OFF time pairs, generated by the selector mechanism from a quantized ON time/OFF time pair generated by the duty cycle quantization mechanism; choosing the ON time/OFF time pair with the lowest implied duty cycle when the output voltage error estimate is highest, and the pair with the highest implied duty cycle when the output voltage error estimate is lowest, and one of the remaining intermediate pairs when the output voltage error is one of the corresponding intermediate values.

Those skilled in the art will understand that the digital duty cycle control mechanism of the present invention may be implemented in mixed signal circuitry including logic circuits and/or a microprocessor with appropriate software or firmware. Further, those skilled in the art will understand that the digital duty cycle control mechanism of the present invention may be applied to any DC/DC converter topology, including but not limited to buck, boost, inverting buck-boost, forward, and flyback converters.

The following figures and descriptions disclose other aspects and advantages of the proposed invention.

BRIEF DESCRIPTION OF THE DRAWINGS

Various aspects and features of the present invention may be understood by examining the following figures:

FIG. 6 is a table of variable-frequency duty cycle pairs indexed by the estimated target duty cycle.

FIG. 7a describes the switching waveforms of a three-phase buck converter.

FIG. 7b describes the switching waveforms of a three-phase buck converter.

FIG. 8a describes the switching waveforms of a three-phase buck converter.

FIG. 8b describes the switching waveforms of a four-phase buck converter.

FIG. 9 describes the switching waveforms of a three-phase buck converter.

FIG. 10 describes the switching waveforms of a three-phase buck converter.

DETAILED DESCRIPTION OF THE INVENTION

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the load on the power converter varies dynamically, or there is a requirement to track changes in load with minimal output voltage error, regulation of these converters is accomplished by continually estimating the output voltage error (the output voltage error being the difference between the uncorrupted output voltage and the desired output voltage) and continually adjusting the duty cycle of the switching device to compensate for changes in load conditions manifest in output voltage error estimates. In this case, the act of regulation consists of controlling, cycle by cycle, the duty cycle of the switching device in accordance with output voltage error estimates, so that the amplitude of the output voltage error is continually minimized.

Regulation mechanisms for this purpose, known as PWM regulators, generally incorporate a pulse width control mechanism and a duty cycle control mechanism, where the former generates the ON pulse appropriate to the realization of the duty cycle generated by the latter. Duty cycle control mechanisms thus incorporate a mechanism for estimating the target duty cycle (the target duty cycle being the duty cycle essential to achieve the desired output voltage). A target duty cycle estimation mechanism is commonly a feedback mechanism, driven by the output voltage error, but it could as well be a feedforward mechanism, driven by the input voltage, or it could be some combination of the two.

The most commonly used pulse width control mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital PWM regulation mechanisms, replacing analog PWM regulators, have been developed and are being commercialized. It is the nature of such mechanisms that the generated pulse widths are quantized—a consequence of the temporal resolution of the digital regulation mechanism. If the temporal resolution of the regulation mechanism is $\Delta t$, then the pulse widths are constrained to be integral multiples of $\Delta t$. Furthermore, switching cycles, spanning consecutive ON and OFF pulses, are likewise constrained to be integral multiples of $\Delta t$.

Figure 1:
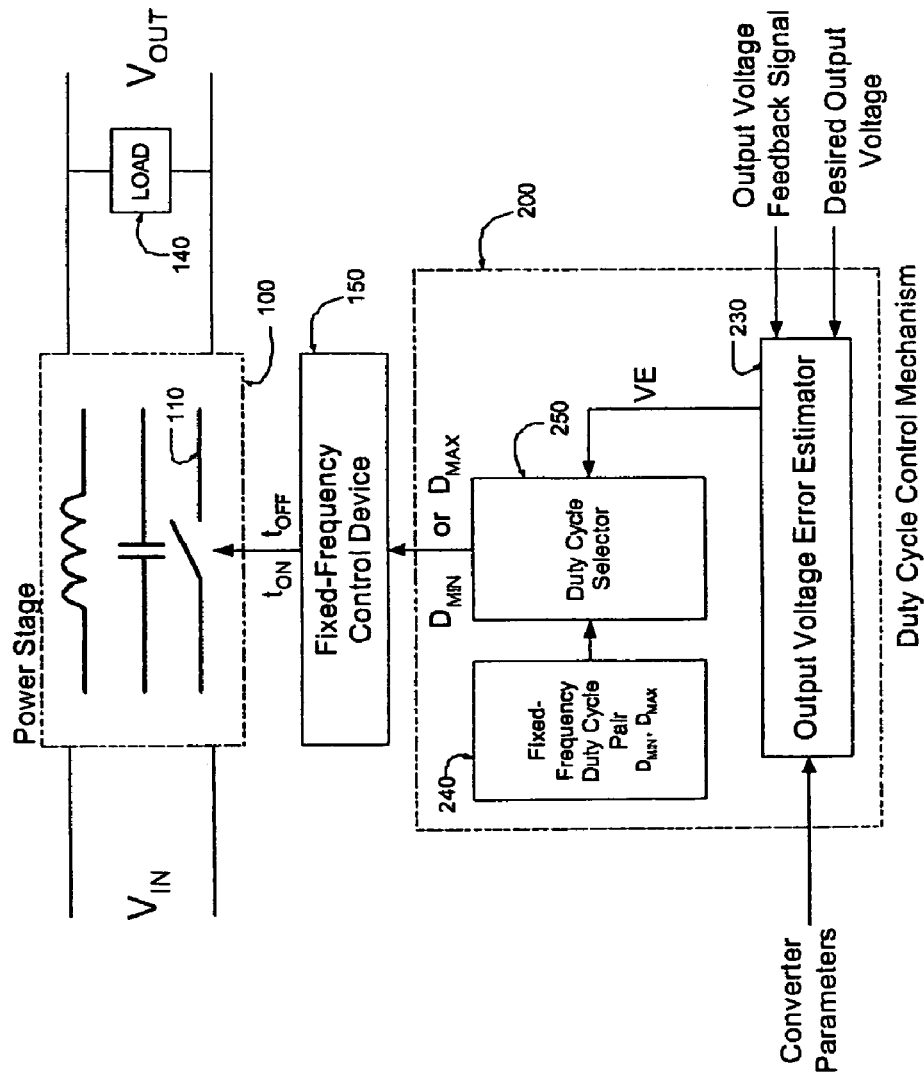
FIG. 1 is a block diagram illustrating a prior art digital duty cycle control mechanism.

FIG. 1 describes a prior art switched-mode DC/DC power converter (cf. U.S. Pat. No. 6,677,733) comprising power stage 100 for the purpose of converting input voltage Vin to output voltage Vout; fixed-frequency control device 150 for the purpose of turning ON and turning OFF the controllable switching device 110, included in power stage 100; and duty cycle control mechanism 200 for controlling the duty cycle of switching device 110.

Because control device 150 is a fixed-frequency control device, it turns ON switching device 110 at fixed intervals, Tsw. Control device 150 turns OFF switching device 110 by translating (if necessary) duty cycle input into ON time, cycle by cycle.

The duty cycle control mechanism is comprised of an output voltage error estimator 230, a mechanism for generating, from an output voltage error signal, an estimate of the uncorrupted output voltage error, and an output-voltage-error-driven duty cycle selector 250 for determining the turn ON and turn OFF times of switching device 110, in such a manner that the amplitude of the output voltage error is continually minimized.

In a digital implementation, the output voltage error estimator frequently takes the form of a digital PID (proportional-integral-differential) filter, operating on an output voltage error signal. PID filters provide the possibility of trading off delay for improved signal-to-noise ratio. Where delay must be minimized, a bi-valued output voltage error estimate derived via a binary comparator may be appropriate. Such is the nature of output voltage error estimator 230. In duty cycle control mechanism 200, the estimate of the output voltage error is sampled by duty cycle selector 250 at the end of every switching cycle, and the value applied to select the duty cycle of the next switching cycle, thereby determining turn ON and turn OFF times of switching device 110.

Accordingly, the duty cycle selector 250 chooses, cycle by cycle, Dmin or Dmax (Dmin and Dmax having been specified to span a range of input voltage specific to the application); choosing Dmin when the output voltage error estimate is positive (i.e., the uncorrupted output voltage is higher than the desired output voltage), and Dmax when the output voltage error estimate is negative.

While the simplicity of the duty cycle control mechanism described above is appealing, the duty-cycle-quantization-induced output voltage ripple can become intolerable if the range of input voltage, and consequently the spread of Dmin and Dmax, is too wide.

Figure 2:
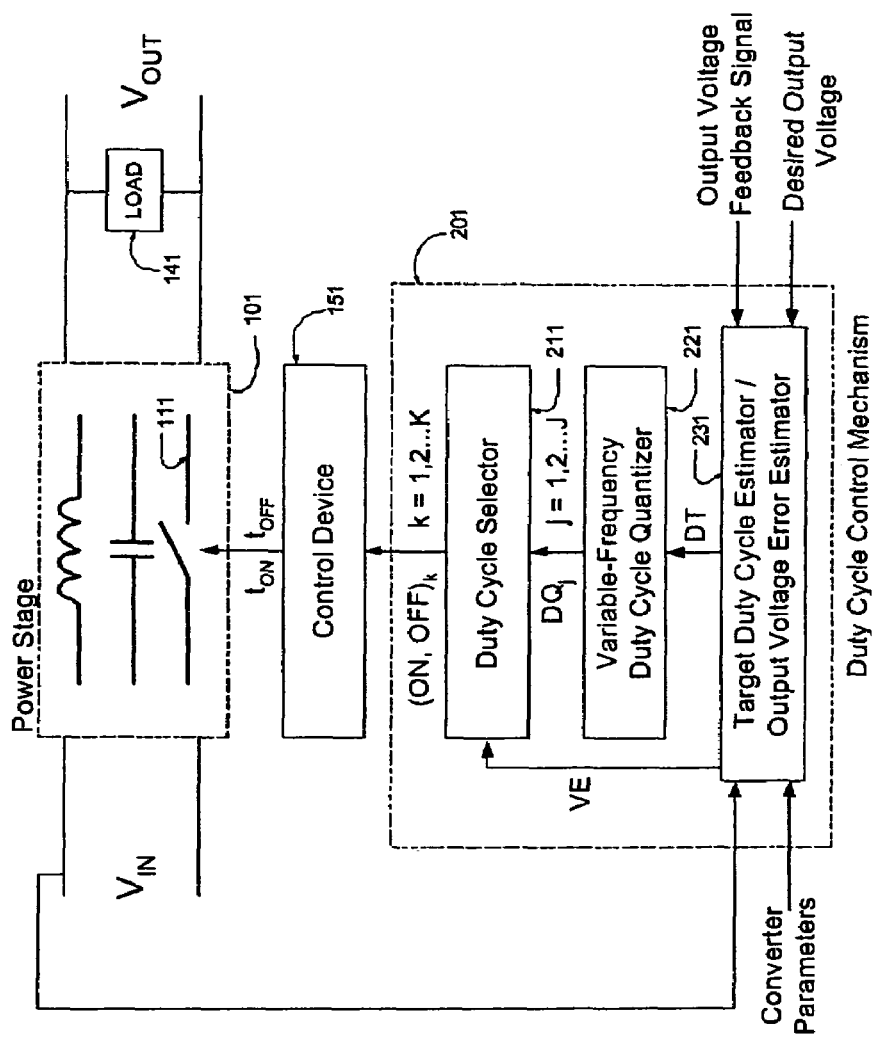
FIG. 2 is a block diagram illustrating a digital duty cycle control mechanism according to the present invention.

FIG. 2 describes a switched-mode DC/DC power converter according to the present invention, comprising power stage 101 for the purpose of converting input voltage Vin to output voltage Vout; control device 151 for the purpose of turning ON and turning OFF the controllable switching device 111, included in power stage 101; and duty cycle control mechanism 201 for controlling the duty cycle of switching device 111.

The control device 151 is further characterized in that, owing to the temporal resolution of the control device, Δt, both the turn ON and turn OFF times of the controllable switching device are constrained to be integral multiples of Δt. Because control device 151 is not a fixed-frequency control device, it must input ON times and OFF times in order to turn ON and turn OFF switching device 111.

The duty cycle control mechanism is comprised of a target duty cycle estimator/output voltage error estimator 231, a mechanism for estimating, from output voltage error signals or input voltage signals or a combination of both, the target duty cycle, DT, and the uncorrupted output voltage error, VE; a variable-frequency duty cycle quantizer 221 for determining, for a target duty cycle estimate, a first set of at least one quantized duty cycle (DQj j=1, 2, . . . J) in the neighborhood of the target duty cycle DT, and otherwise suited for controlling switching device 111, and an output-voltage-error-driven duty cycle selector 211, for determining the turn ON and turn OFF times of switching device 111 by generating, from the first set of duty cycles DQj, a second set of at least two quantized duty cycles (DQk k=1, 2, . . . K, ordered from lowest to highest), and choosing, cycle by cycle, a duty cycle (and its corresponding ON time/OFF time pair) from the second set of duty cycles DQk, choosing in such a manner that the amplitude of the output voltage error is continually minimized.

In a digital implementation, the target duty cycle estimator 231 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 231 is frequently implemented as a PID filter. PID filters provide the possibility of trading off delay for improved signal-to-noise ratio. Where delay must be minimized, even at the price of a limited reliability output voltage error estimate, a bi-valued or tri-valued output voltage error estimate derived via binary or ternary comparators is simple and effective. Such is the nature of output voltage error estimator 231. Furthermore, in duty cycle control mechanism 201, the output-voltage-error-driven duty cycle selector 211 chooses the duty cycle based on samples of the output voltage error estimate taken during the ON time or the OFF time or both.

In the case that duty cycle selector 211 chooses the duty cycle based on samples of the output voltage error estimate taken during the ON time, the estimate of the output voltage error is sampled by duty cycle selector 211 after the switching cycle has begun but before the choice of duty cycle has been determined, and applied (by duty cycle selector 211) in time to effect the turn OFF implicit in the chosen duty cycle. For a buck converter, where the output voltage error excursions are symmetric with respect to the mean, the output voltage error estimate may be derived straightforwardly by sampling a binary or ternary comparator. The ideal error sampling time may be determined from the ON times of DQ1 and DQK; specifically, the sampling time relative to the start of the switching cycle is ¼(ON1+ONK), rounded down (if necessary) to the nearest multiple of Δt. The computation of the sampling time must be done as often as set DQj changes.

For a boost converter, where the output voltage error excursions are not symmetric with respect to the mean, the derivation of an output voltage error estimate is not as straightforward. In this case, a bi-valued or tri-valued output voltage error estimate is most easily constructed from two bi-valued samples of the error voltage, separated in time but specified such that in the steady state, one sample would normally be positive and the other negative. For example, the first sample could be taken ¼(OFF1+OFFK) after the turn OFF time (prior to the start of a switching cycle), and the second sample ¼(ON1+ONK) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is set to zero (in the construction of a tri-valued estimate), or left unchanged from the previous value (in the construction of a bi-valued estimate).

Where it is necessary to further limit output voltage ripple, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is set to zero (in the construction of a tri-valued estimate), or left unchanged from the previous value (in the construction of a bi-valued estimate).

In the case that duty cycle selector 211 chooses the duty cycle based on samples of the output voltage error estimate taken during the ON time AND AGAIN during the OFF time, the estimate of the output voltage error is sampled by duty cycle selector 211 ONCE after the switching cycle has begun but before the turn OFF time has been determined, and sampled AGAIN after the turn OFF time but before the final determination of duty cycle, and its implied turn ON time. The duty cycle selector 211 applies the first sample to limit the choice of duty cycles, and in so doing determines the turn OFF time; and applies the second sample to choose, finally, the duty cycle, and in so doing determines the turn ON time, marking the end of the switching cycle. Both choices are made immediately on sampling, in time to effect the turn OFF and the turn ON implicit in the chosen duty cycle. The ideal sampling times may be determined from the ON and OFF times of DQ1 and DQK. The first sampling time, relative to the start of the switching cycle, is ¼(ON1+ONK) rounded down (if necessary) to the nearest multiple of Δt; the second sampling time, relative to the turn OFF time, is ¼(OFF1+OFFK) rounded down (if necessary) to the nearest multiple of Δt. The computation of the sampling times must be done as often as set DQj changes.

Accordingly, the duty cycle selector 211 chooses, cycle by cycle, a duty cycle from the set DQk (and its corresponding ON time/OFF time pair); choosing DQ1 when the aggregate output voltage error estimate is highest, DQK when the aggregate output voltage error estimate is lowest, and one of the remaining intermediate duty cycles when the aggregate output voltage error is one of the corresponding intermediate values.

The determination of the set DQj for a given value of DT, is accomplished by the variable-frequency duty cycle quantizer 221 via a two-step process, the first step being the enumeration of quantized duty cycles in the neighborhood of DT, and the second step being the selection of DQj from the enumerated possibilities. The systematic enumeration of quantized duty cycles is accomplished by generating a set of quantized ON time/OFF time pairs characterized in that the sum of the quantized ON time and OFF time of each pair (in said first set) is constrained to a set of discrete values {Tswi} (i=1, 2, . . . I) where I is a positive integer and Tswi is an integral multiple of Δt. This set of quantized pairs is trivially transformed into a set of quantized duty cycles. More switching cycle possibilities translates to more duty cycle possibilities, making it possible to select duty cycles DQj closer to DT, a critical factor in the minimization of quantization-induced output voltage ripple. The set DQj is chosen from the enumerated possibilities on the basis of proximity to DT. If J=1, then DQ1 (or DQ) is chosen as the duty cycle closest to but less than DT. If J=2, then DQ1 and DQ2 are chosen as the duty cycles that most closely bracket DT. If J=3, the set DQj will consist of the three duty cycles which collectively bracket DT and are closest to DT.

The determination of the second set (or working set) of duty cycles DQk from the first set DQj, is accomplished by the duty cycle selector 211 via a two-step process, the first step being the extension (if necessary) of the set DQj, and the second step being the selection of DQk from the extension of set DQj. The extension of the set DQj, to XDQj (j=1, 2, . . . JJ), provides a comprehensive set of quantized duty cycles from which an effective working set DQk can be selected. The extension can be accomplished in a variety of ways, consistent with the constraint on the sum of the quantized ON time and OFF time of each ON time/OFF time pair. To illustrate, if J=1 and DQ1=m/n, a very simple extension could be performed by setting XDQj=(m+(j−2))/n. To provide finer resolution, XDQj could be set as follows:

|     |                              |              |
| --- | ---------------------------- | ------------ |
| and | XDQj = (m + (j − 3)/2)/n     | if j is odd  |
| and | XDQj = (m + (j − 4)/2)/(n − 1) | if j is even, |
| or  | XDQj = (m + (j − 3)/2)/n     | if j is odd  |
| and | XDQj = (m + (j − 2)/2)(n + 1) | if j is even. |

JJ, the number of elements of set XDQj, should be large enough so that the largest duty cycle in the set is large enough to compensate for the effects of parasitics at high load. The computation of set XDQj must be done as often as set DQj changes.

The working set of duty cycles, DQk, a subset of set XDQJ, may be determined statically or dynamically; that is to say DQk may be a prescribed subset of XDQj, or it may be dynamically "mapped" to a generally contiguous subset of XDQj, determined by the load-dependent effects of parasitics, for example. The number of elements in this subset, K, is in either case determined by the logic of the duty cycle selector. In the case that duty cycle selector 211 chooses the duty cycle based on binary or ternary values of the output voltage error estimate taken during the ON time or the OFF time, the number of elements, K, is 2 or 3; in the case that duty cycle selector 211 chooses the duty cycle based on binary or ternary values of the output voltage error estimate taken during both the ON time and the OFF time, the number of elements, K, ranges from 4 to 9. In case K=2, the prescribed subset of XDQj, namely duty cycles XDQ1 and XDQJJ, may generate intolerable output voltage ripple. This could be an artifact of the effect of parasitics, necessitating a significantly higher duty cycle at high load than at low load. To compensate, a mechanism for dynamically determining DQk is useful.

A simple but effective mechanism to dynamically determine a working set of duty cycles in the case that K=2 is to count the number of consecutive DQ1's or DQ2's, and when it exceeds a prescribed threshold, adjust DQ1 and DQ2 up or down by "sliding" or repositioning DQk within XDQj. Alternatively, a count of the excess of DQ1's over DQ2's or of DQ2's over DQ1's, in a window, could be used to adjust DQ1 and DQ2. Both of these mechanisms could be adapted for other values of K.

The foregoing mechanism for dynamically adjusting the working set of duty cycles can be used to compensate for variation in line voltage (Vin) as well as the load-dependent effects of parasitics. In this case there is no need for a target duty cycle estimator or a variable-frequency duty cycle quantizer, as defined herein. Any quantized duty cycle suitable for achieving regulation in some neighborhood of the Desired Output Voltage (Vdo) would be sufficient to enable the duty cycle selector to construct and empirically adjust the working set of duty cycles to achieve precise regulation at Vdo. Similarly, a pair of quantized duty cycles suitable for maintaining regulation across the range of specified line and load conditions would be sufficient to enable the duty cycle selector. These quantized duty cycles could be presented to the duty cycle selector as converter design parameters, or as auto-initialized parameters, generated in the course of the start-up of the converter, for example.

The application of variable-frequency duty cycle quantization, same-cycle output voltage feedback, and dynamic adjustment of the working set of duty cycles to compensate for the variations in input voltage (Vin) as well as the load-dependent effects of parasitics significantly improve static and dynamic performance, at minimal computational cost. While the duty cycle control mechanism described above has implicit performance limitations similar in nature to those of prior art duty cycle control mechanisms, the effects of duty cycle quantization on performance are substantially reduced, without introducing application dependencies.

Figure 3:
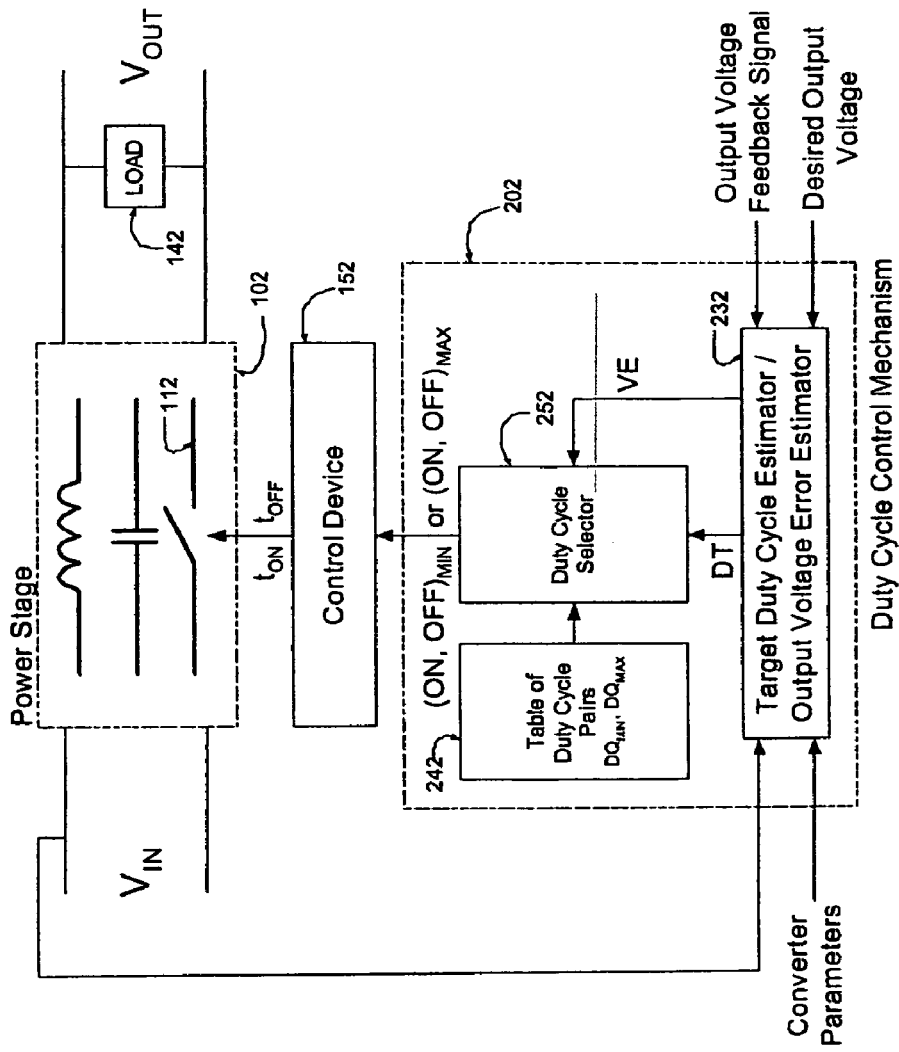
FIG. 3 is a block diagram illustrating one embodiment of a digital duty cycle control mechanism according to the present invention.

FIG. 3 describes a switched-mode DC/DC power converter according to the present invention, comprising power stage 102 for the purpose of converting input voltage Vin to output voltage Vout; control device 152 for the purpose of turning ON and turning OFF the controllable switching device 112, included in power stage 102; and duty cycle control mechanism 202 for controlling the duty cycle of switching device 112.

The control device 152 is further characterized in that, owing to the temporal resolution of the control device, $\Delta t$, both the turn ON and turn OFF times of the controllable switching device are constrained to be integral multiples of $\Delta t$. Because control device 152 is not a fixed-frequency control device, it must input ON times and OFF times in order to turn ON and turn OFF switching device 112.

The duty cycle control mechanism is comprised of a target duty cycle estimator/output voltage error estimator 232, a mechanism for estimating, from an output voltage error signal or an input voltage signal or a combination of both, the target duty cycle, DT, and the uncorrupted output voltage error, VE; and an output-voltage-error-driven duty cycle selector 252, for determining the turn ON and turn OFF times of switching device 112 by choosing, cycle by cycle, a quantized duty cycle (and its corresponding quantized ON time/OFF time pair) from a pair of quantized duty cycles (DQmin and DQmax bracketing DT), extracted from a table of duty cycle pairs 242, indexed by the estimated target duty cycle, DT; choosing in such a manner that the amplitude of the output voltage error is continually minimized.

In a digital implementation, the target duty cycle estimator 232 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 232 is frequently implemented as a PID filter. PID filters provide the possibility of trading off delay for improved signal-to-noise ratio. Where delay must be minimized, a bi-valued output voltage error estimate derived via a binary comparator is simple and effective. Such is the nature of output voltage error estimator 232. Furthermore, in duty cycle control mechanism 202, the output voltage error is sampled by duty cycle selector 252 after the switching cycle has begun but before the choice of duty cycle has been determined, and applied (by duty cycle selector 252) in time to effect the turn OFF implicit in the chosen duty cycle.

For a buck converter, where the output voltage error excursions are symmetric with respect to the mean, the output voltage error estimate may be derived straightforwardly by sampling a binary comparator. The ideal error sampling time may be determined from the ON times of DQmin and DQmax; specifically, the sampling time relative to the start of the switching cycle is $\frac{1}{2}$(ONmin+ONmax), rounded down (if necessary) to the nearest multiple of $\Delta t$. The computation of the sampling time must be done as often as DT changes; but could be avoided entirely by incorporating the sampling time into table 242.

For a boost converter, where the output voltage error excursions are not symmetric with respect to the mean, the derivation of an output voltage error estimate is not as straightforward. In this case, a bi-valued output voltage error estimate is most easily constructed from two bi-valued samples of the error voltage, separated in time but specified such that in the steady state, one sample would normally be positive and the other negative. For example, the first sample could be taken $\frac{1}{2}$(OFFmin+OFFmax) after the turn OFF time (prior to the start of a switching cycle), and the second sample $\frac{1}{2}$(ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is left unchanged from the previous value.

Where it is necessary to further limit output voltage ripple, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is left unchanged from the previous value.

Whether buck or boost, the duty cycle selector 252 chooses, cycle by cycle, DQmin or DQmax (and its corresponding ON time/OFF time pair), DQmin and DQmax having been extracted from table 242, indexed by DT; choosing DQmin when the output voltage error estimate is positive (i.e., the uncorrupted output voltage is higher than the desired output voltage), and DQmax when the output voltage error estimate is negative.

The content and construction of the table of duty cycle pairs 242 is described in FIG. 6. The determination of DQmin and DQmax for a given value of DT is a two-step process, the first step being the enumeration of quantized duty cycles in the neighborhood of DT, and the second step being the selection of DQmin and DQmax from the enumerated possibilities. The systematic enumeration of quantized duty cycles is accomplished by generating a set of quantized ON time/OFF time pairs characterized in that the sum of the quantized ON time and OFF time of each pair (in said first set) is constrained to a set of discrete values {Tswi} (i=1, 2, . . . I) where I is a positive integer and Tswi is an integral multiple of $\Delta t$. This set of quantized pairs is trivially transformed into a set of quantized duty cycles. More switching cycle possibilities translates to more duty cycle possibilities, making it easier to select duty cycles close astride DT, a critical factor in the minimization of quantization-induced output voltage ripple. One method of choosing DQmin and DQmax is to search the space of quantized duty cycles in the neighborhood of DT and choose the closest on either side of DT. Experience has taught that these choices may be problematic (with respect to output voltage ripple) when one of the chosen duty cycles is close to DT and the other, relatively far away. In that case, it is preferable to reject the closer in favor of the second (or third) closest duty cycle on the on the same "side" of DT as the rejected duty cycle. Once DQmin and DQmax are determined, the associated ON time/OFF time pairs, designated (ON, OFF) min and (ON, OFF)max, are derived trivially.

To estimate the size of table 242, consider the example of a duty cycle control mechanism with a 20 MHz clock, controlling a power stage with a nominal switching frequency of 1.25 MHz (16 clocks per nominal switching cycle), where switching cycles are allowed to vary ± one clock period from nominal. If the ON and OFF times associated with DQmax were encoded relative to the ON and OFF times associated with DQmin, the resulting table could be organized as 12×128.

The simplicity of the duty cycle control mechanism described above is appealing. The computational advantages of having a table of duty cycle pairs available, comes at the cost of a modest amount of infrequently-accessed memory. But the combination of variable-frequency duty cycle quantization and same-cycle output voltage feedback significantly improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

Figure 4:
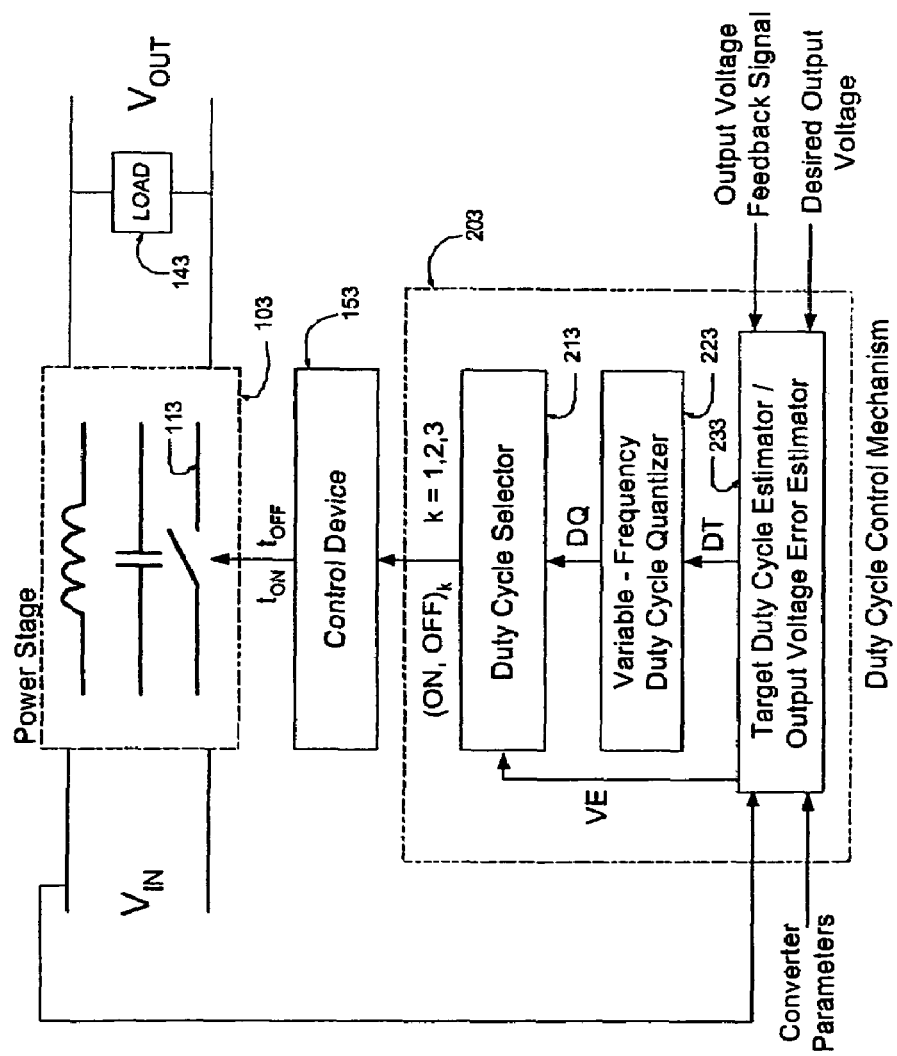
FIG. 4 is a block diagram illustrating a second embodiment of a digital duty cycle control mechanism according to the present invention.

FIG. 4 describes a switched-mode DC/DC power converter according to the present invention, comprising power stage 103 for the purpose of converting input voltage Vin to output voltage Vout; control device 153 for the purpose of turning ON and turning OFF the controllable switching device 113, included in power stage 103; and duty cycle control mechanism 203 for controlling the duty cycle of switching device 113.

The control device 153 is further characterized in that, owing to the temporal resolution of the control device, Δt, both the turn ON and turn OFF times of the controllable switching device are constrained to be integral multiples of Δt. Because control device 153 is not a fixed-frequency control device, it must input ON times and OFF times in order to turn ON and turn OFF switching device 113.

The duty cycle control mechanism is comprised of a target duty cycle estimator/output voltage error estimator 233, a mechanism for estimating, from an output voltage error signal or an input voltage signal or a combination of both, the target duty cycle, DT, and the uncorrupted output voltage error, VE; a variable-frequency duty cycle quantizer 223 for determining the quantized duty cycle DQ closest to the target duty cycle estimate, DT; and an output-voltage-error-driven duty cycle selector 213, a mechanism for determining the turn ON and turn OFF times of switching device 113 by generating, for each value of DQ, a set of three quantized duty cycles (DQmin, DQ, and DQmax, ordered from lowest to highest) and by choosing, cycle by cycle, DQmin or DQ or DQmax (and its corresponding ON time/OFF time pair), choosing in such a manner that amplitude of the output voltage error is continually minimized.

In a digital implementation, the target duty cycle estimator 233 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 233 is frequently implemented as a PID filter. PID filters provide the possibility of trading off delay for improved signal-to-noise ratio. Where delay must be minimized, and dynamic response is important, a tri-valued output voltage error estimate derived via a ternary comparator (a binary comparator with a dead zone) is simple and effective. Such is the nature of output voltage error estimator 233. Furthermore, in duty cycle control mechanism 203, the estimate of the output voltage error is sampled by duty cycle selector 213 after the switching cycle has begun but before the choice of duty cycle has been determined, and applied (by duty cycle selector 213) in time to effect the turn OFF implicit in the chosen duty cycle.

For a buck converter, where the output voltage error excursions are symmetric with respect to the mean, the output voltage error estimate may be derived straightforwardly by sampling a ternary comparator. The ideal sampling time may be determined from the ON times of DQmin and DQmax; specifically, the sampling time relative to the start of the switching cycle is ¼(ONmin+ONmax), rounded down (if necessary) to the nearest multiple of Δt. The computation of the sampling time must be done as often as DQ changes.

(It is noted here that the tri-valued output voltage error estimate could also be constructed from two bi-valued error samples separated in time but specified such that in the steady state, one sample would normally be positive and the other negative.)

For a boost converter, where the output voltage error excursions are not symmetric with respect to the mean, the derivation of an output voltage error estimate is not as straightforward. In this case, a tri-valued output voltage error estimate is most easily constructed from two bi-valued samples of the error voltage, separated in time but specified such that in the steady state, one sample would normally be positive and the other negative. For example, the first sample could be taken ¼(OFFmin+OFFmax) after the turn OFF time (prior to the start of a switching cycle), and the second sample ¼(ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is zero (neither positive nor negative).

Where it is necessary to further limit output voltage ripple, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is zero (neither positive nor negative).

Whether buck or boost, the duty cycle selector 213 chooses, cycle by cycle, DQmin or DQ or DQmax (and its corresponding ON time/OFF time pair); choosing DQmin when the output voltage error estimate is positive (i.e., the uncorrupted output voltage is higher than the desired output voltage), DQmax when the output voltage error estimate is negative, and DQ when the output voltage error estimate is zero (neither positive nor negative).

The determination of DQ for a given value of DT, is accomplished by the variable-frequency duty cycle quantizer 223 via a two-step process, the first step being the enumeration of quantized duty cycles in the neighborhood of DT, and the second step being the selection of DQ from the enumerated possibilities. The systematic enumeration of quantized duty cycles is accomplished by generating a set of quantized ON time/OFF time pairs characterized in that the sum of the quantized ON time and OFF time of each pair (in said first set) is constrained to a set of discrete values {Tswi}

(i=1, 2, ... I) where I is a positive integer and Tswi is an integral multiple of $\Delta t$. This set of quantized pairs is trivially transformed into a set of quantized duty cycles. More switching cycle possibilities translates to more duty cycle possibilities, making it possible to select a duty cycle closer to DT, a critical factor in the minimization of quantization-induced output voltage ripple. DQ is chosen as the duty cycle closest to but less than DT, and its associated ON time/OFF time pair is derived trivially.

The determination of DQmin and DQmax is accomplished by the duty cycle selector 213. While a number of options are available, a simple, and cost effective option is to set: and:

| | |
|---|---|
| ONmin = ONq − 1 × $\Delta t$ | OFFmin = OFFq + 1 × $\Delta t$ |
| ONq = ONq | OFFq = OFFq |
| ONmax = ONq + 1 × $\Delta t$ | OFFmax = OFFq − 1 × $\Delta t$ |

As indicated above, the tri-valued output voltage error estimate determines the ON time, adjusting ONq by −1, 0, or +1 clocks. The OFF time is determined implicitly by adjusting OFFq in the opposite direction. These values allow the converter to respond effectively to changes in line and load conditions, at the cost of modest output voltage ripple.

A second simple and cost effective option is to set: and:

| | |
|---|---|
| ONmin = ONq − 1 × $\Delta t$ | OFFmin = OFFq |
| ONq = ONq | OFFq = OFFq |
| ONmax = ONq | OFFmax = OFFq − 1 × $\Delta t$ |

As indicated above, the tri-valued output voltage error estimate determines the ON time, adjusting ONq by −1, 0, or 0 clocks. The OFF time is determined by adjusting OFFq by 0, 0, or −1. These values allow the converter to reduce output voltage ripple at the cost of increasing the sensitivity to changes in line and load conditions.

The simplicity of the duty cycle control mechanism described above is appealing. Moreover, the application of same-cycle, tri-valued output voltage feedback significantly improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

Figure 5:
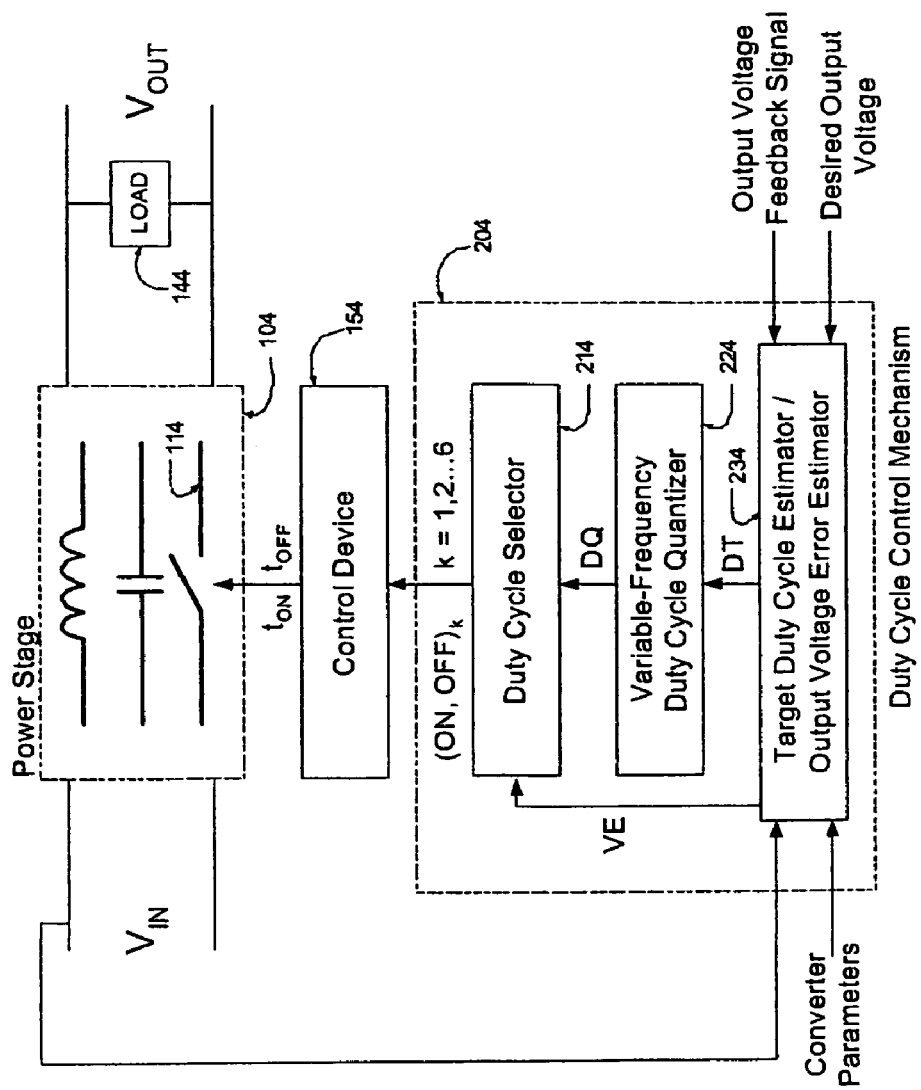
FIG. 5 is a block diagram illustrating a third embodiment of a digital duty cycle control mechanism according to the present invention.

FIG. 5 describes a switched-mode DC/DC power converter according to the present invention, comprising power stage 104 for the purpose of converting input voltage Vin to output voltage Vout; control device 154 for the purpose of turning ON and turning OFF the controllable switching device 114, included in power stage 104; and duty cycle control mechanism 204 for controlling the duty cycle of switching device 114.

The control device 154 is further characterized in that, owing to the temporal resolution of the control device, $\Delta t$, both the turn ON and turn OFF times of the controllable switching device are constrained to be integral multiples of $\Delta t$. Because control device 154 is not a fixed-frequency control device, it must input ON times and OFF times in order to turn ON and turn OFF switching device 114.

The duty cycle control mechanism is comprised of a target duty cycle estimator/output voltage error estimator 234, a mechanism for estimating, from an output voltage error signal or an input voltage signal or a combination of both, the target duty cycle, DT, and the uncorrupted output voltage error, VE; a variable-frequency duty cycle quantizer 224 for determining the quantized duty cycle DQ closest to the target duty cycle estimate, DT; and an output-voltage-error-driven duty cycle selector 214, a mechanism for determining the turn ON and turn OFF times of switching device 114 by generating, for each value of DQ, a set of six quantized duty cycles (DQmin, DQmn, DQn, DQx, DQmx, and DQmax, ordered from lowest to highest) and by choosing, cycle by cycle, DQmin or DQmn or DQn or DQx or DQmx or DQmax (and its corresponding ON time/OFF time pair), choosing in such a manner that amplitude of the output voltage error is continually minimized.

In a digital implementation, the target duty cycle estimator 234 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 234 is frequently implemented as a PID filter. PID filters provide the possibility of trading off delay for improved signal-to-noise ratio. Where delay must be minimized, and both static and dynamic response are important, a more precise output voltage error estimate, derived from multiple samples, may be appropriate. Such is the nature of output voltage error estimator 234. Furthermore, in duty cycle control mechanism 204, the estimate of the output voltage error is sampled by duty cycle selector 214 ONCE, via a ternary comparator, after the switching cycle has begun but before the turn OFF time has been determined, and sampled AGAIN, via a binary comparator, after the turn OFF time but before the final determination of duty cycle, and its implied turn ON time. The duty cycle selector 214 applies the first sample to limit the choice of duty cycles, and in so doing determines the turn OFF time; and applies the second sample to choose, finally, the duty cycle, and in so doing determines the turn ON time, marking the end of the switching cycle. Both choices are made immediately on sampling, in time to effect the turn OFF and the turn ON implicit in the chosen duty cycle.

For a buck converter, where the output voltage error excursions are symmetric with respect to the mean, the output voltage error estimate may be derived straightforwardly by sampling a ternary comparator. The ideal sampling times are determined from the ON and OFF times of DQmin and DQmax. The first sampling time, relative to the start of the switching cycle, is ¼(ONmin+ONmax) rounded down (if necessary) to the nearest multiple of $\Delta t$; the second sampling time, relative to the turn OFF time, is ¼(OFFmin+OFFmax) rounded down (if necessary) to the nearest multiple of $\Delta t$. The computation of the sampling times must be done as often as DQ changes.

(It is noted here that the tri-valued output voltage error estimate could also be constructed from two bi-valued samples separated in time but specified such that in the steady state, one sample would normally be positive and the other negative. Further, it is noted that in the event two bi-valued samples were used to obtain a tri-valued output voltage error estimate, the tri-valued estimate could be scheduled during switch ON when DT>0.5 and during switch OFF when DT<0.5. In this case the bi-valued estimate would be scheduled during switch ON when DT<0.5 and during switch OFF when DT>0.5.)

For a boost converter, where the output voltage error excursions are not symmetric with respect to the mean, the derivation of an output voltage error estimate is not as straightforward. In this case, a tri-valued output voltage error estimate is most easily constructed from two bi-valued samples of the error voltage, separated in time but specified such that in the steady state, one sample would normally be positive and the other negative. For example, the first sample could be taken ¼(OFFmin+OFFmax) after the turn OFF time (prior to the start of a switching cycle), and the second sample ¼(ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is zero (neither positive nor negative).

Where it is necessary to further limit output voltage ripple, the foregoing logic may be modified so that if one sample is positive and the other negative, the output voltage error estimate is determined by evaluating the difference in the value of the output voltage at the second sample from its value in the previous switching cycle. If the difference is positive (the current value is greater than the previous value), the error estimate is positive; if the difference is negative, the error estimate is negative; if the difference is zero, the error estimate is zero (neither positive nor negative).

Accordingly, the duty cycle selector 214 chooses, cycle by cycle, DQmin, DQmn, DQn, DQx, DQmx, or DQmax (and its corresponding ON time/OFF time pair); choosing DQmin when the aggregate output voltage error estimate is highest, DQmax when the aggregate output voltage error estimate is lowest, and one of the remaining intermediate duty cycles when the aggregate output voltage error is one of the corresponding intermediate values.

The determination of DQ for a given value of DT, is accomplished by the variable-frequency duty cycle quantizer 223 via a two-step process, the first step being the enumeration of quantized duty cycles in the neighborhood of DT, and the second step being the selection of DQ from the enumerated possibilities. The systematic enumeration of quantized duty cycles is accomplished by generating a set of quantized ON time/OFF time pairs characterized in that the sum of the quantized ON time and OFF time of each pair (in said first set) is constrained to a set of discrete values {Tswi} (i=1, 2, ... I) where I is a positive integer and Tswi is an integral multiple of $\Delta t$. This set of quantized pairs is trivially transformed into a set of quantized duty cycles. More switching cycle possibilities translates to more duty cycle possibilities, making it possible to select a duty cycle closer to DT, a critical factor in the minimization of quantization-induced output voltage ripple. DQ is chosen as the duty cycle closest to but less than DT, and its associated ON time/OFF time pair is derived trivially.

The determination of DQmin thru DQmax is accomplished by the duty cycle selector 213. While a number of options are available, a simple, and cost effective option is to set: and:

| | |
|---|---|
| ONmin = ONq − 1 × $\Delta t$ | OFFmin = OFFq + 2 × $\Delta t$ |
| ONmn = ONq − 1 × $\Delta t$ | OFFmn = OFFq |
| ONn = ONq | OFFn = OFFq + 1 × $\Delta t$ |
| ONx = ONq | OFFx = OFFq − 1 × $\Delta t$ |
| ONmx = ONq + 1 × $\Delta t$ | OFFmx = OFFq |
| ONmax = ONq + 1 × $\Delta t$ | OFFmax = OFFq − 2 × $\Delta t$ |

As indicated above, the tri-valued output voltage error estimate determines the ON time, adjusting ONq by −1, 0, or +1 clocks. The second, bi-valued estimate determines the OFF time, adjusting OFFq by +2, +1, 0, −1, or −2 clocks, depending on the values of both estimates. These values allow the converter to respond effectively to changes in line and load conditions, and limit output voltage ripple in the steady state.

The simplicity of the duty cycle control mechanism described above is appealing. Moreover, the application of twice-in-the-same-cycle output voltage feedback further improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

While the foregoing duty cycle control mechanisms (implementing the PWM paradigm) are capable of providing effective output voltage regulation while the power converter is operating in continuous conduction mode, provision for efficient operation at light load often requires the addition of a low-power or power-saving control mechanism for regulating output voltage when the power converter transitions to discontinuous conduction mode. Mechanisms for regulating in discontinuous conduction mode (DCM) generally implement the pulse frequency modulation (PFM) paradigm, wherein the controllable switch is turned ON, for a fixed period, whenever the output voltage error estimate drops below a prescribed threshold value. In this case, it is necessary to devise a mechanism to detect the transition into and out of DCM, and effect a smooth transition from one duty cycle control mechanism to the other. Such a mechanism must handle abrupt as well as gradual changes in load.

When the load is gradually reduced, the rise in the output voltage results in a reduction in the duty cycle, until at some point the converter transitions from CCM to DCM. At this point, the ON time is fixed and the OFF time varied in accordance with the PFM paradigm. An abrupt reduction in load is typically detected when the rise in output voltage triggers a threshold detection mechanism. In this case, the transfer from PWM to PFM may be accomplished straightforwardly by holding the switch OFF until the converter transitions from CCM to DCM.

Once in PFM mode, the switching frequency becomes load-dependent. At very light loads, the switching frequency may approach the audible range. To eliminate objectionable audible noise, the ON time fixed at the onset of PFM must be carefully determined.

The abrupt resumption of load (from a low-load state) presents the more serious challenge to designers of power supply regulators. In the case of a buck converter, for example, the slam is typically detected when the (slam-induced) droop in the output voltage triggers a threshold detection mechanism. The transition from PFM to PWM may then be accomplished straightforwardly, by holding the switch ON until the energy stored in the converter is sufficient to supply the new load at the desired output voltage (via the PWM duty cycle control mechanism).

In the case of a boost converter, however, the recovery from a slam is a bit more complicated, owing to the flyback nature of the boost topology. The switch cannot be held ON until the energy stored in the capacitor is sufficient to supply the new load, but must be cycled. One approach to effecting the transition from PFM to PWM in this case is to transition to PWM immediately on detection of a slam, via a sequence of working sets of duty cycles converging to the working set of duty cycles, DQk, appropriate to the new load. The algorithm described below is illustrative of a class of algorithms effective in converging a "wide" working set of duty cycles to a "narrow" set astride the duty cycle appropriate to precise regulation at the new (higher) load.

This convergence algorithm is initiated whenever the transition from DCM to CCM is detected or whenever the slam-induced droop in the output voltage (Vout) triggers a threshold detection mechanism. It operates through distinct phases by first "widening" the spread of the working set of duty cycles and then "narrowing" the spread, that is the difference in the numerators of the largest and smallest duty cycles in the working set, by 1 until the spread is 1. If, for example, the spread of the initial working set is 4, three distinct phases are required. The length of each phase is determined by the length of a "long cycle", which begins and ends when Vout first rises above Vdo. During these phases the controller simply selects the low duty cycle of the working set when the output voltage error estimate is positive, and the high duty cycle when the output voltage error estimate is negative. When the output voltage error is zero (neither positive nor negative) the previously selected duty cycle is selected.

At the end of each phase the spread of the working set is reduced in a manner that attempts to keep the requisite (but unknown) duty cycle centered within the working set. This is accomplished by counting the number of high duty cycle selections (highs) and low duty cycle selections (lows). The current spread of the working duty cycle set is essentially divided into thirds. If highs $\geq 2\times$ lows, then the low duty cycle in the set is adjusted upward by 1 in the numerator, and the high duty cycle is determined by adding the reduced spread to the numerator of the (new) low duty cycle. If lows $\geq 2\times$ highs, then the high duty cycle in the set is adjusted downward by 1 in the numerator, and the low duty cycle is determined by subtracting the reduced spread from the numerator of the (new) high duty cycle.

If neither of the foregoing are true, the requisite duty cycle is deduced to lie in the middle third of the current range. This third is actually split into two sixths. If highs > lows, then the high duty cycle is reduced by an amount less than a full step in the numerator. This is done by incrementing the denominator by one. The low duty cycle is determined by subtracting the reduced spread from the numerator of the (new) high duty cycle. If highs < lows, then the low duty cycle is increased by an amount less than a full step in the numerator. This is done by decrementing the denominator by one. The high duty cycle is determined by adding the reduced spread to the numerator of the (new) low duty cycle. Special considerations may be made where a "long cycle" is too short or where the denominator must be maintained within a specified range.

The inventions detailed in the preceding paragraphs have applicability beyond the single-phase and single-output converters used to illustrate their application. The multi-phase buck converter, which is used to supply precisely regulated power to high end microprocessors provides an excellent case in point. Because high end microprocessors draw high current (100 amps is not atypical) at low voltage (1 volt is not atypical) efficiency dictates that current be sourced by multiple buck converters. Furthermore, by operating them synchronously, the output voltage ripple frequency is the product of the per-phase switching frequency and the number of phases, enabling a practical tradeoff between switching losses and the size of the output filter components. In FIGS. 7a and 7b, the switching waveforms of a synchronous three-phase buck converter operating at 1 MHz (333 KHz per phase) are described, assuming a 20 MHz clock. In the case Vin=12 volts and Vdo=1.8 volts, the target duty cycle is 9/60. In the case Vin=12 volts and Vdo=1.5 volts, the target duty cycle is 7.5/60, achieved by averaging duty cycles of 7/60 and 8/60. In FIGS. 8a and 8b, the switching waveform of a three-phase buck converter operating at 1 MHz is compared with that of a four-phase buck converter, also operating at 1 MHz.

All the techniques developed for single-phase buck converters, namely variable-frequency duty cycle quantization, same-cycle output voltage feedback, and dynamic adjustment of the working set of duty cycles, are applicable to the control of the multiple phases of a multi-phase buck converter. Applying same-cycle feedback, for example, each ON time/OFF time pair of each phase would be selected from the working set of ON time/OFF time pairs for said phase, based on an output voltage error estimate generated after switch ON, but before the turn OFF time implied by the output voltage error estimate.

To apply the technique of variable-frequency duty cycle quantization without disrupting the synchronization of multiple interleaved phases, the concept of dual ON time/OFF time pairs (derived from dual quantized duty cycles) is useful. To illustrate this concept, consider a three-phase buck converter with Vin=12 volts and Vdo=1.3 volts. Assume further that the interleaved phases are (each) switched at an average rate of 3 cycles per usec, and the controller operates at 20 MHz. Accordingly, the average switching cycle is 60 clocks and the target duty cycle, DT, is 1.3/12 or 6.5/60. Each working set of duty cycles would likely include 6/60 and 7/60. If the working sets were limited to these two duty cycles, and used in conjunction with a binary output voltage error estimate, the converter may produce excessive output voltage ripple. To reduce this ripple without increasing the clock frequency, each working set of duty cycles could be expanded so as to exploit a ternary output voltage error estimate. If the additional duty cycle is added between 6/60 and 7/60 (say 7/65), the potential exists to desynchronize the converter. To prevent desynchronization, the dual of 7/65, namely; 6/55, is added to the working set, and selected in alternating sequence. When the output voltage error estimate is LO, 7/60 would be selected; when the output voltage error estimate is HI, 6/60 would be selected; when the output voltage error estimate is NEITHER, the selection would alternate between 6/55 and 7/65.

Multi-phase buck converters require current sense feedback to insure that the per-phase currents are balanced, initially on startup and dynamically during operation. FIG. 9 illustrates the interaction of the current sense feedback system with the output voltage feedback system. In FIG. 9, the ON time in Phase 1 is incremented by 1 clock at every third switching cycle, in order to bring the current into balance with Phase 2 and Phase 3. Here the determination of ON time is accomplished through a combination of current sense and output voltage feedback.

One method for sensing the imbalance of the per-phase currents is to compare them to the average of the per-phase inductor currents at selected points in time. To illustrate this method, consider a three-phase converter wherein the phases are designated (in sequence) phase i, phase j, and phase k; the switches are designated switch i, switch j, and switch k; the inductor currents are designated Ci, Cj, and Ck; and the average of the three inductor currents is designated Cn (Cn=(Ci+Cj+Ck)/3). Midway through the ON time of switch i, Ci and Cn are compared. If Ci<Cn, it may be appropriate to increment the ON time of switch i (relative to the value implied by the output voltage error estimate) by one clock, to correct for the imbalance of Ci. If Ci>Cn, it may be appropriate to decrement the ON time of switch i by one clock. If neither of the foregoing is true, the ON time of switch i would be determined solely by the output voltage error estimate. Similarly, midway through the ON time of switch j, Cj and Cn would be compared; and midway through the ON time of switch k, Ck and Cn would be compared.

The method outlined above suggests the use of binary comparators. Ternary comparators could likewise be used to implement this method.

Because the imbalance in per-phase currents is often the result of thermal influences, which act slowly, a mechanism for dynamically adjusting the working set of duty cycles (of each phase), such as the one described previously, could "take over" a portion of the work of the current feedback system as equilibrium is reached. With coarse adjustments factored into the working set of duty cycles (of each phase), the current sense feedback system assumes the role of making fine adjustments.

The step response of the multi-phase buck converter is critical inasmuch as high end microprocessors impose stringent requirements on undershoot and overshoot. FIG. 10 describes the switching waveforms of a three-phase buck converter operating at low load (off a single phase) when an abrupt increase in load is detected, and all switches are turned ON until the energy imbalance (between inductors and capacitor) can be restored. In FIG. 10 the switch in Phase 1 is turned OFF ahead of the switches in Phase 2 and Phase 3, to illustrate that per-phase current limits may impair recovery from a slam when the converter is sourcing current from a single phase. Nevertheless, regulating in the digital domain greatly facilitates the implementation of control strategies as well as the resynchronization of the several phases following a step change in load.

I claim:

1. A method of converting an input voltage to an output voltage by means of a switched-mode DC/DC converter; the input voltage (Vin) being converted into an output voltage (Vout) with the aid of a power stage (PS), including at least one controllable switching device (CS), which is turned ON and turned OFF by a control device (CD) characterized in that
   Owing to the temporal resolution of the control device, $\Delta t$, both the turn ON and turn OFF times of the controllable switching device (CS) are constrained to be integral multiples of $\Delta t$; and
   A duty cycle control mechanism (DC) for controlling the duty cycle of said controllable switching device, comprising:
   A mechanism for estimating output voltage error, the output voltage error being the difference between the uncorrupted output voltage and the desired output voltage (Vdo); and
   A selector mechanism (SM) for determining, for the current output voltage error estimate, the turn OFF and turn ON times of said controllable switching device by choosing, cycle by cycle, an ON time/OFF time pair from a set of at least two quantized ON time/OFF time pairs, suitable for controlling said controllable switching device and characterized in that the sum of the quantized ON time and OFF time of each pair (in said set) is constrained to a set of discrete values $\{Tsw_i\}$ (i=1, 2, . . . I) where I is a positive integer and $Tsw_i$ is an integral multiple of $\Delta t$; choosing in such a manner that the amplitude of the output voltage error is continually minimized, and
   A mechanism for dynamically adjusting the set of at least two quantized ON time/OFF time pairs to compensate for variations in input voltage (Vin) as well as the load-dependent effects of parasitics.

2. The method of claim 1, wherein the converter is a buck converter.

3. The method of claim 1, wherein the converter is a multi-phase buck converter.

4. The method of claim 1, wherein the converter is a boost converter.

5. The method of claim 1, wherein the converter is an inverting buck-boost converter.

6. The method of claim 1, wherein the converter is an up-down converter.

7. The method of claim 1, wherein the converter is a forward converter.

8. The method of claim 1, wherein the converter is a flyback converter.

9. The method of claim 1, wherein the converter is a multi-output converter, including at least two controllable switching devices.

10. The method of claim 1, wherein the set of at least two ON time/OFF time pairs is a set of exactly j pairs (j=1, 2, . . . J), ordered in terms of their implied duty cycle from Lowest to Highest; and
    Wherein the output voltage error estimate is j-valued and ordered from Highest to Lowest; and
    Wherein the selector mechanism (SM) chooses the ON time/OFF time pair with the Lowest implied duty cycle when the current output voltage error estimate is Highest, and the pair with the Highest implied duty cycle when the current output voltage error estimate is Lowest, and one of the remaining intermediate pairs when the current output voltage error is one of the corresponding intermediate values.

11. The method of claim 1, wherein the current output voltage error estimate is generated, and the ON time/OFF time pair from the set of at least two quantized ON time/OFF time pairs is chosen, after the switching cycle (defined as the period from turn ON to turn ON) has begun, but before the turn OFF time implicit in the chosen pair.

12. The method of claim 1, wherein the current output voltage error estimate is generated, and the ON time/OFF time pair from the set of at least two quantized ON time/OFF time pairs is chosen, after the switching cycle (defined as the period from turn OFF to turn OFF) has begun, but before ON time implicit in the chosen pair.

13. The method of claim 1, wherein the set of at least two ON time/OFF time pairs is a set of exactly 2 pairs, ordered in terms of their implied duty cycle from Low to High; and
    Wherein the output voltage error estimate is bi-valued: High and Low; and
    Wherein the selector mechanism (SM) chooses the ON time/OFF time pair with the Low implied duty cycle when the current output voltage error estimate is High, and the pair with the High implied duty cycle when the current output voltage error estimate is Low.

14. The method of claim 13, wherein the current output voltage error estimate is generated, and the ON time/OFF time pair chosen, after the switching cycle (defined as the period from turn ON to turn ON) has begun, but before the turn OFF time implicit in the chosen pair.

15. The method of claim 13, wherein the output voltage error estimate is the output of a binary comparator.

16. The method of claim 1, wherein the set of at least two ON time/OFF time pairs is constrained, by the selector mechanism (SM), to prevent excessive Electromagnetic Interference (EMI).

17. The method of claim 16, wherein said constraint takes the form of a requirement that the longest of the switching cycles implied by said ON time/OFF time pairs differs from the shortest by at most n×Δt (n=1, 2, . . . N).

18. The method of claim 3, wherein the selector mechanism further operates to insure that the sequencing of each phase of the multi-phase buck converter is accomplished in accordance with standard multi-phase practice.

19. The method of claim 9, wherein the selector mechanism further operates to insure that the controllable switching devices are not switched ON simultaneously.

20. The method of claim 1, wherein the mechanism employed to dynamically adjust the set of at least two quantized ON time/OFF time pairs employs at least one counter and at least one comparator.

21. A method of converting an input voltage to an output voltage by means of a switched-mode DC/DC converter; the input voltage (Vin) being converted into an output voltage (Vout) with the aid of a power stage (PS), including at least one controllable switching device (CS), which is turned ON and turned OFF by a control device (CD) characterized in that Owing to the temporal resolution of the control device, Δt, both the turn ON and turn OFF times of the controllable switching device (CS) are constrained to be integral multiples of Δt; and A duty cycle control mechanism (DC) for controlling the duty cycle of said controllable switching device, comprising:

A mechanism for estimating output voltage error, the output voltage error being the difference between the uncorrupted output voltage and the desired output voltage (Vdo); and A selector mechanism (SM) for determining, for the current output voltage error estimate, the turn OFF and turn ON times of said controllable switching device by choosing, cycle by cycle, an ON time/OFF time pair from a set of at least two quantized ON time/OFF time pairs, suitable for controlling said controllable switching device and characterized in that the sum of the quantized ON time and OFF time of each pair (in said set) is constrained to a set of discrete values {Tswi} (i=1, 2, . . . I) where I is a positive integer and Tswi is an integral multiple of Δt; choosing in such a manner that the amplitude of the output voltage error is continually minimized, and wherein the current output voltage error estimate is generated, and the ON time/OFF time pair from the set of at least two quantized ON time/OFF time pairs is chosen, after the switching cycle (defined as the period from turn ON to turn ON) has begun, but before the turn OFF time implicit in the chosen pair.

22. A method of converting an input voltage to an output voltage by means of a switched-mode DC/DC converter; the input voltage (Vin) being converted into an output voltage (Vout) with the aid of a power stage (PS), including at least one controllable switching device (CS), which is turned ON and turned OFF by a control device (CD) characterized in that Owing to the temporal resolution of the control device, Δt, both the turn ON and turn OFF times of the controllable switching device (CS) are constrained to be integral multiples of Δt; and A duty cycle control mechanism (DC) for controlling the duty cycle of said controllable switching device, comprising:

A mechanism for estimating output voltage error, the output voltage error being the difference between the uncorrupted output voltage and the desired output voltage (Vdo); and A selector mechanism (SM) for determining, for the current output voltage error estimate, the turn OFF and turn ON times of said controllable switching device by choosing, cycle by cycle, an ON time/OFF time pair from a set of at least two quantized ON time/OFF time pairs, suitable for controlling said controllable switching device and characterized in that the sum of the quantized ON time and OFF time of each pair (in said set) is constrained to a set of discrete values {Tswi} (i=1, 2, . . . I) where I is a positive integer and Tswi is an integral multiple of Δt; choosing in such a manner that the amplitude of the output voltage error is continually minimized.

* * * * *